United States Patent [19]
Fisher

[11] 3,960,246
[45] June 1, 1976

[54] SPRING POWER DEVICE

[76] Inventor: Elliott Fisher, 732 S. Lorraine Blvd., Los Angeles, Calif. 90005

[22] Filed: July 22, 1974

[21] Appl. No.: 490,676

[52] U.S. Cl............................ 185/40 H; 200/61.78
[51] Int. Cl.² .................... F03G 1/00; H01H 3/16
[58] Field of Search ............. 185/40 R, 40 B, 40 H, 185/44, 43, 40 K; 200/47, 61.78, 61.76

[56] References Cited
UNITED STATES PATENTS

| 1,389,735 | 9/1921 | Broach............................. 185/40 H |
| 1,721,807 | 7/1929 | Eisiminger et al............... 185/40 H |
| 3,267,659 | 8/1966 | Hancock.......................... 185/K X |
| 3,395,687 | 8/1968 | Harkness........................ 185/43 X |
| 3,621,172 | 11/1971 | Clark............................... 200/47 X |
| 3,664,736 | 5/1972 | Jungjohann et al.......... 185/40 R X |

*Primary Examiner*—Samuel Scott
*Assistant Examiner*—Lance W. Chandler

[57] ABSTRACT

A spring power device is provided which includes a multiturn coil spring having its inner end anchored to a rotatable shaft and its outer end anchored to a large drive gear which is mounted to rotate freely on the shaft. An electric motor is connected to rotate the shaft. Whenever the coil spring winds down, a microswitch senses the radial outward movement of the outermost turn thereof and connects a battery to energize the motor to wind up the inner end of the coil spring at a fast rate. The drive gear is controlled to release the power stored in the coil spring to drive a load.

5 Claims, 11 Drawing Figures

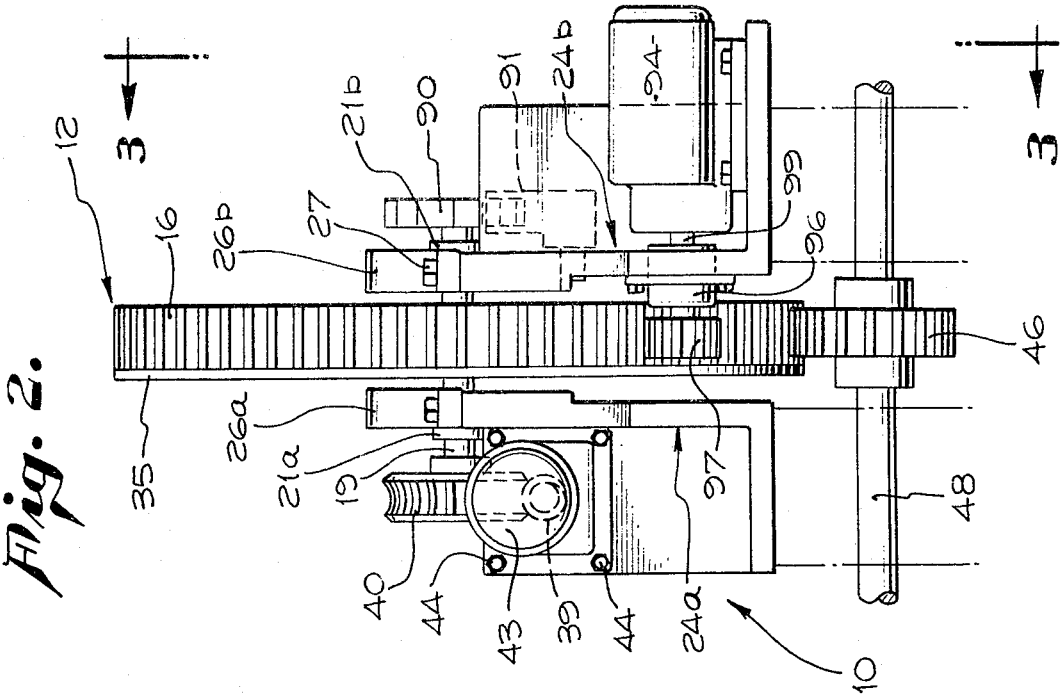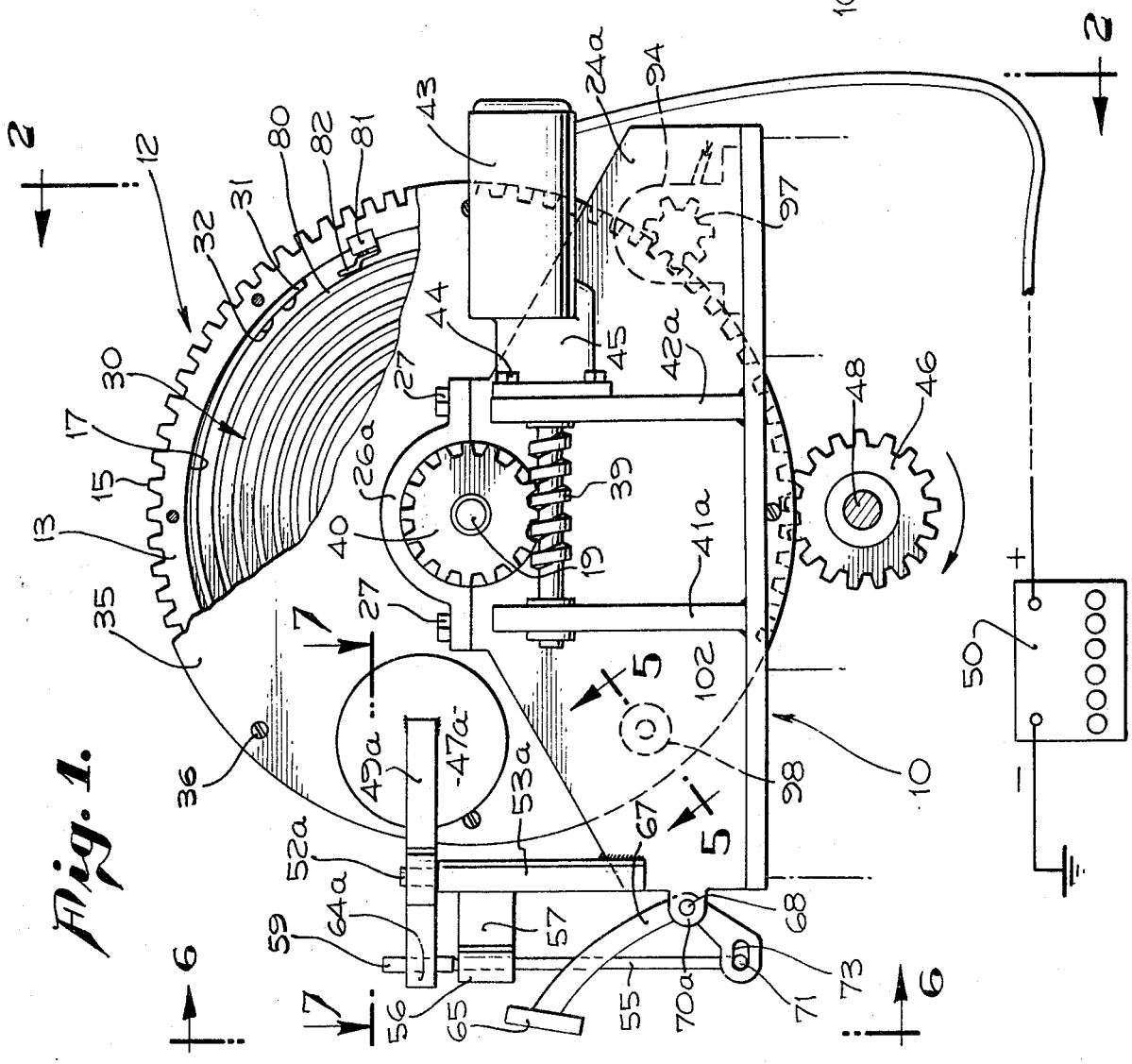

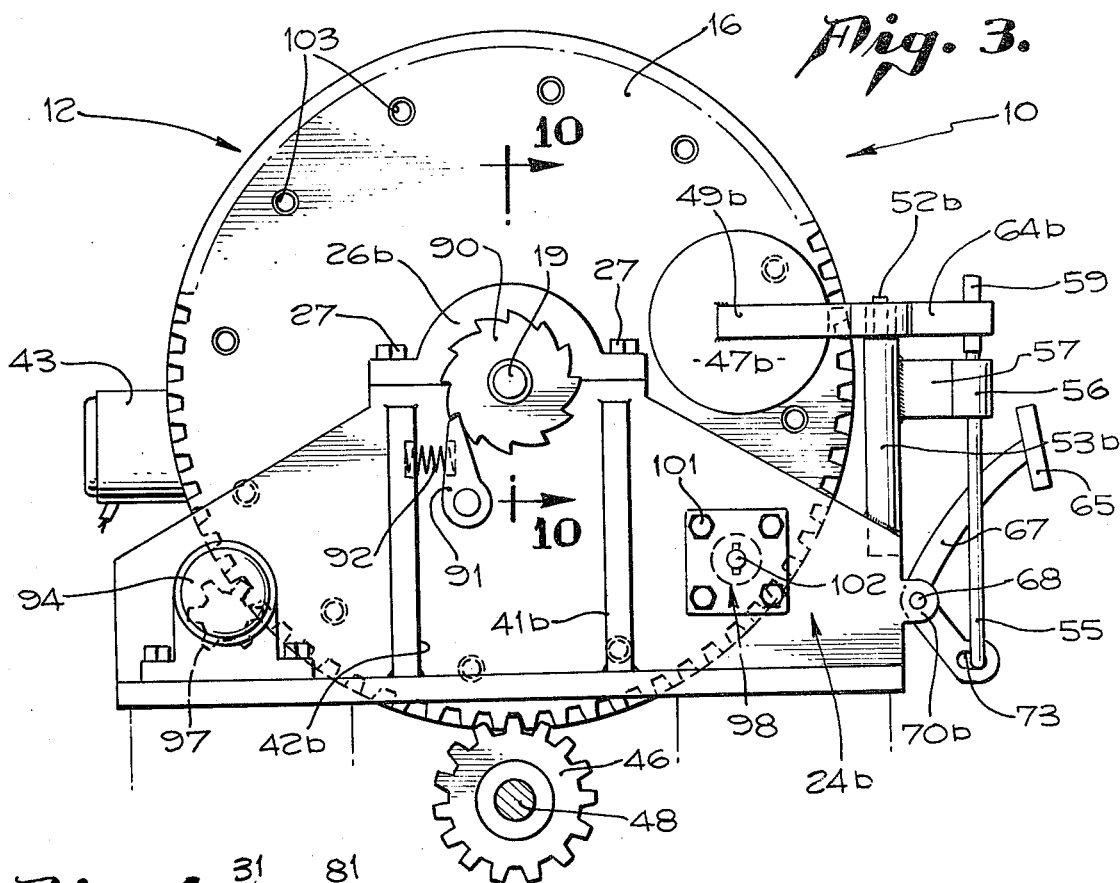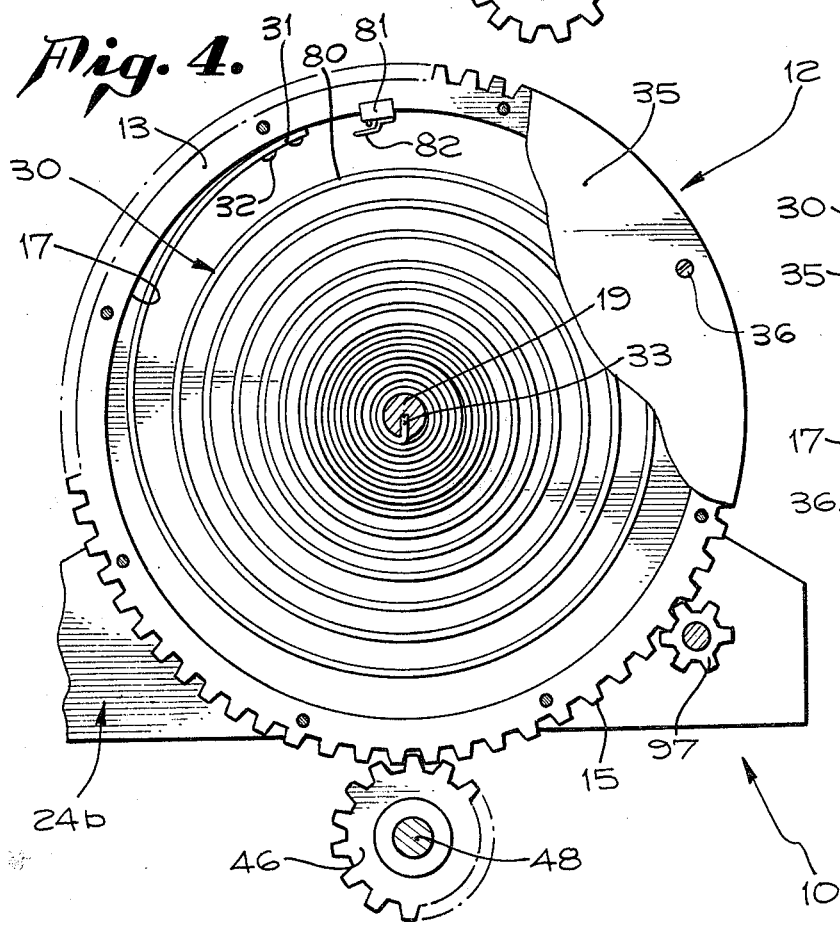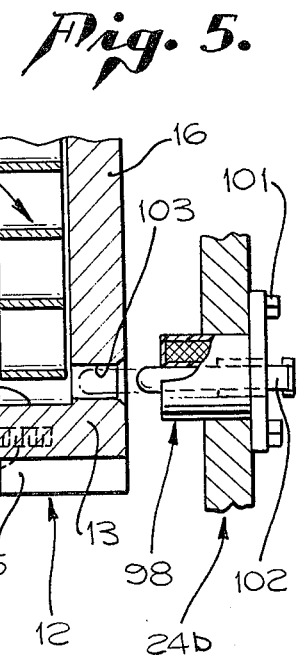

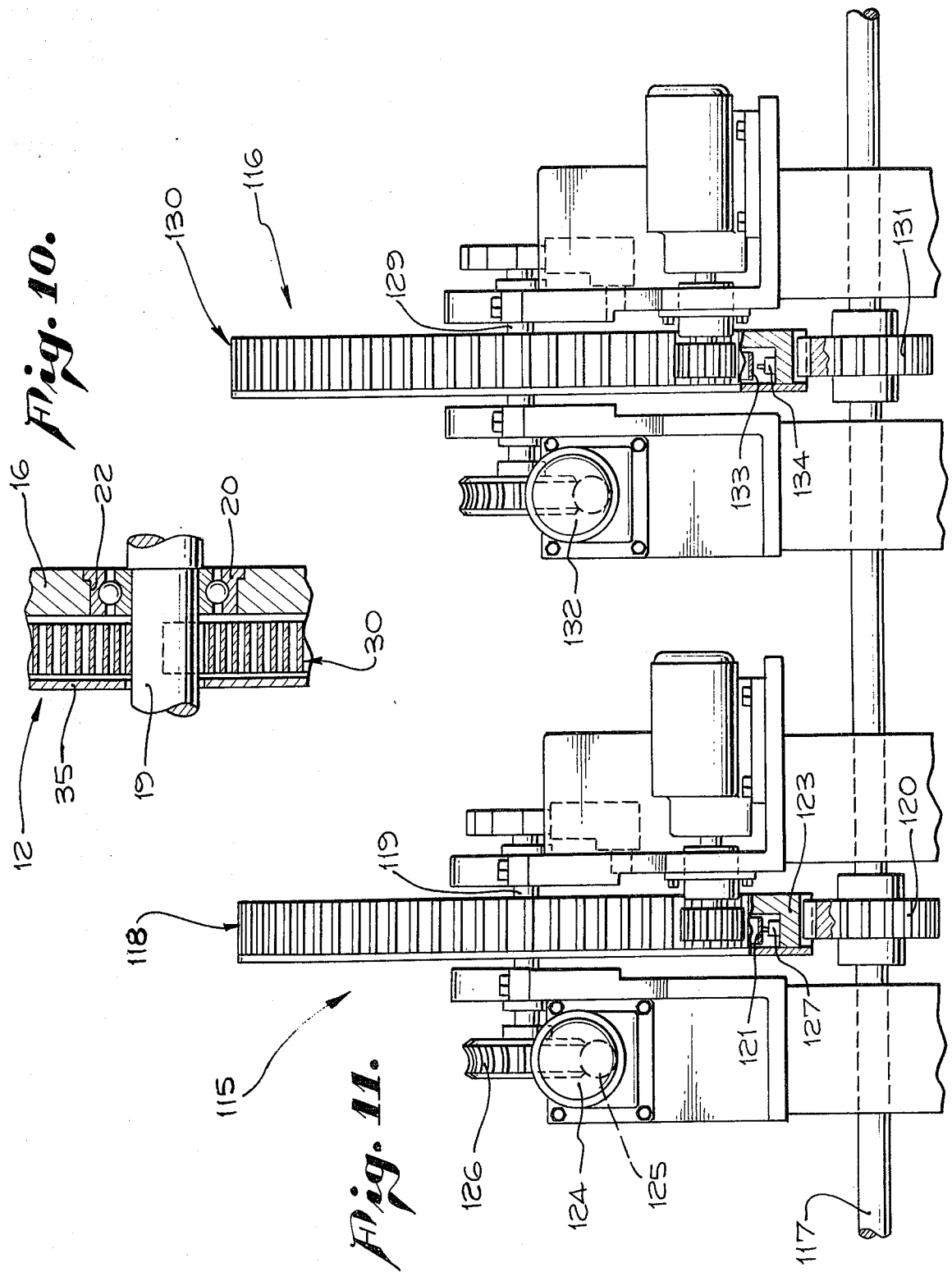

SPRING POWER DEVICE

This invention relates to power units and more particularly to a spring power device which utilizes an electric motor to keep it in a wound up operating condition.

An object of the present invention is to provide an improved spring power device that may be used in propelling vehicles such as automobiles, motorcycles, boats, golf carts, etc.

Another object of the invention is to provide a spring power device with a switching circuit arrangement that is effective to connect an electric motor to quickly wind up the coil spring thereof whenever the latter winds down to a predetermined point during the operation thereof.

Still another object of the invention is to provide a spring power device wherein while the outer end of a coil spring is being unwound to rotate a drive gear driving a load, the inner end of the coil spring may be simultaneously being wound up by an electric motor to store energy therein.

Briefly, the spring power device of the present invention comprises a multiturn coil spring having its inner end anchored to a rotatably mounted shaft and its outer end anchored to a main drive gear concentrically mounted to rotate freely on the shaft. An electric motor is connected to rotate the shaft. When the motor is energized it rotates the shaft at a high speed so as to place the coil spring under considerable tension in a short period of time. Braking means are then provided for permitting the main drive gear to be released for rotation by the coil spring to drive a load. To control the energizing of the electric motor, a microswitch is attached adjacent the rim of the main gear. As the coil spring unwinds during the operation thereof, its outermost turn moves radially outwardly from the shaft such that it contacts the arm of the microswitch. The closing of the microswitch energizes a holding circuit in series with the time delay switch which connects a battery into the circuit and energizes the electric motor. Thus, each time the coil spring winds down to a predetermined point, the motor is energized to wind up the coil spring at high speed for a short period of time until the time delay switch opens. The operation is such that while the main drive gear is being rotated by the unwinding of the outer end of the coil spring to drive the load, the inner end of the coil spring can simultaneously be wound up by the electric motor for the purpose of storing energy therein.

With these and other objects in view, the invention consists in the construction, arrangement and combination of the various parts of the device whereby the objects contemplated are attained as hereinafter set forth, pointed out in the appended claims and illustrated in the accompanying drawings.

IN THE DRAWINGS

FIG. 1 shows a side view of the spring power device of the present invention;

FIG. 2 is a front end view of the spring power device taken in the direction of the arrows 2—2 of FIG. 1;

FIG. 3 is a side view of the spring power device opposite to that shown in FIG. 1 as taken in the direction of arrows 3—3 of FIG. 2;

FIG. 4 is a side view of the main drive gear with the cover side plate therefor cut away to show the coil spring nested therein;

FIG. 5 is a fragmentary sectional view showing the solenoid locking mechanism as taken in the direction of arrows 5—5 of FIG. 1;

FIG. 10 is a fragmentary sectional view as taken along lines 10—10 in FIG. 3; and FIG. 11 is a modified dual spring power device arrangement.

Figure 6:
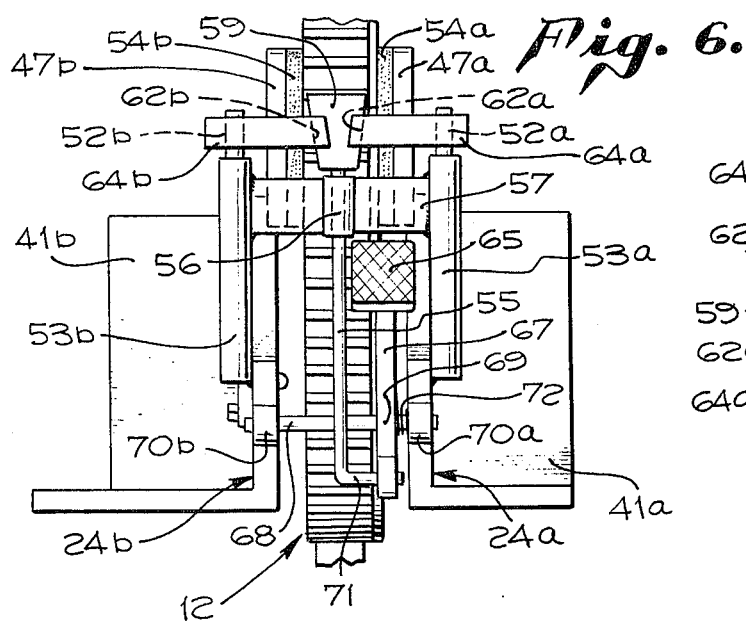
FIG. 6 is a partial rear view of the spring power device showing the braking mechanism thereof.

Referring to the drawings, the spring power device 10 of the present invention includes a large main drive gear 12 having a peripheral rim 13 with teeth 15 and an integrally formed side wall 16. The rim 13 and the side wall 16 define a cylindrical cavity 17. The main drive gear 12 has a bearing 20 in a central opening 22 of the side wall 16 thereof (FIG. 10) by which it is mounted to freely rotate on a shaft 19. The ends of the shaft 19 are journaled on bearings 21a and 21b provided on the upper ends of side supports 24a and 24b located on either side of the main drive gear 12. Upper bearing housings 26a and 26b are disposed on the upper ends of the side supports 24a and 24b and held by clamping screws 27.

Nested within the cylindrical cavity 17 formed by the rim 13 and the integral side wall 16 of the main drive gear 12 is a multiturn coil spring 30. The coil spring 30 is formed of a long, flat strip of high grade spring steel. The inner end 33 of the coil spring 30 is anchored by welding, for example, to the rotatably shaft 19, and the outer end 31 of the coil spring 30 is anchored by screws 32 to the inner periphery of the rim 13 of the drive gear 12. The open side of the cylindrical cavity 17 formed by the main drive gear 12 is covered by a cover plate 35 which is secured by screws 36 to the side of rim 13 of the main drive gear 12. The cover plate 35 thus forms a side wall on the drive gear 12 which is opposite and spaced from the integral side wall 16 thereof. It should be noted that the coil spring 30 is completely enclosed within cavity 17. This makes it possible for the coil spring 30 to be wound up with considerable tension without concern about the release of the energy stored therein in the event that it should accidentally break loose from within the cavity.

A worm 39 is supported with its ends rotatably mounted on spaced stiffening members 41a and 42a extending outwardly from the side support 24a. The worm 39 engages a worm gear 40 keyed on the end of the shaft 19. A main motor 43 having a integral gear box 45 is attached by screws 44 to the stiffening member 42a. The motor 43 is connected to rotate the shaft 19. A storage battery 50 when connected by a switching circuit arrangement to be subsequently described supplies current to energize the motor 43.

To prevent the shaft 19 from rotating reversely after the inner end of coil spring 30 has been wound up by motor 43, a ratchet wheel 90 is attached to the end of the shaft 19. The ratchet wheel 90 is held by a pawl 91 pivotally attached to the side support 24b and provided with a compression spring 92 which bears against stiffening member 42b of side support 24b to hold the pawl 91 in engagement with the teeth of the ratchet wheel 90.

Figure 7:
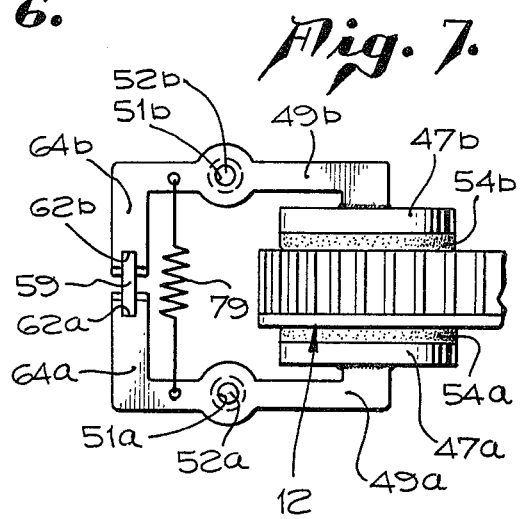
FIG. 7 is a top view of the braking mechanism shown in FIG. 6.

One manner of controlling the rotation of the main drive gear 12 is provided by a brake mechanism. This mechanism includes a pair of brake pads 47a and 47b having appropriate brake linings 54a and 54b, respectively. The brake linings of brake pads 47a and 47b normally bear closely against the respective side walls 16 and 35 of the main drive gear 12 to prevent it from rotating. Vertical posts 53a and 53b are attached by welding, for example, to the respective side supports 24a and 24b. As shown in FIGS. 6 and 7, the horizontally disposed arms 49a and 49b of the brake mechanism 46 have vertical bores 51a and 51b intermediate the ends thereof by which the arms are pivotally mounted on the reduced diameter upper ends 52a and 52b of the vertical posts 53a and 53b, respectively. A rod member 55 is slidably mounted for vertical movement in a vertical bore 56 provided on a cross member 57 whose ends are attached to the posts 53a and 53b. The vertical sliding rod member 55 has a wedge member 59 attached to the top thereof. The wedge member 59 has its slanted sides fitted in similarly slanted slots 62a and 62b on the opposing surfaces of the inwardly extending portions 64a and 64b of the arms 49a and 49b, respectively.

A foot pedal 65 may be provided for operating the brake mechanism 46. The foot pedal 65 has an intermediate point 69 of its lever 67 welded to a shaft 68 whose ends are pivotally mounted on ears 70a and 70b extending from the forward end of the side supports 24a and 24b. A laterally bent portion 71 of the rod member 55 extends through an elongated slot 73 provided on the lower end of the lever 67. A spring 79 extends across and operates to pull together the outer portions 64a and 64b of the arms 49a and 49b which are located on the sides of the pivot points 52a and 52b opposite from the brake pads 47a and 47b, respectively. The spring 79 acts to hold the opposing slanted surfaces of the slots 62a and 62b against the opposing slanted sides of the wedge member 59. A spring 72 coiled about the shaft 68 has one end anchored on lever 67 and the other end anchored on ear 70 a. The spring 72 is adapted to return the foot pedal 65 when no longer depressed to its normal position shown.

It should now be clear that normally the coil spring 30 is wound up, i.e., storing energy therein and the brake pads 47a and 47b are adapted to bear against the opposite side walls 16 and 35 of the main drive gear 12 so as to prevent the latter from rotating. Then, when the foot pedal 65 is depressed, the wedge member 59 is moved upwardly to permit the portions 64a and 64b of the arms 49a and 49b to be pulled together by spring 79, and thereby cause the brake pads 47a and 47b to be pulled apart. This enables the main drive gear 12 to be released to rotate about the shaft 19 by the action of coil spring 30, and thus drives the gear 46 to rotate the output shaft 48 having a load connected thereto.

Figure 9:
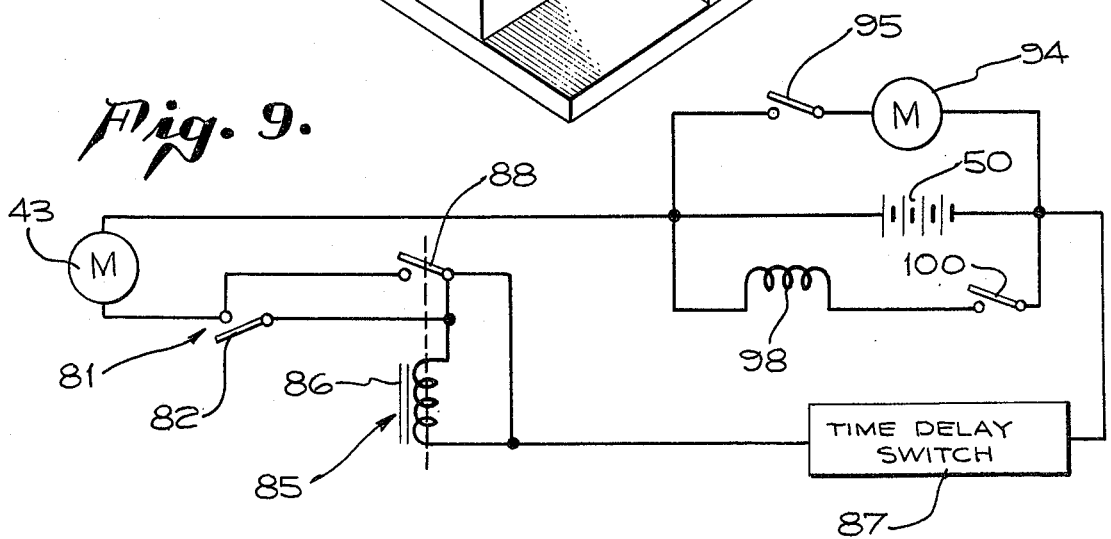
FIG. 9 is a schematic electrical circuit diagram associated with the spring power device.

As shown in FIG. 1 a microswitch 81 having a leaf spring arm 82 is attached to the inner peripheral surface of the rim 13 of the drive gear 12. The microswitch 81 is normally open as shown in FIG. 4. However, when the outermost turn 80 of the coil spring bears on the arm 82 of the microswitch 81 (FIG. 1) the latter closes a circuit to the electric motor 43. The circuit arrangement for spring power device 10 is schematically illustrated in FIG. 9. Thus, when the microswitch 81 is closed the circuit connecting the battery 50 is completed causing current to energize the high speed motor 43. This circuit energizes a holding circuit 85 comprised of an armature 86 which closes switch 88 and holds the circuit closed even after the microswitch 81 is opened. Thus, when the microswitch 81 is closed by contact of the outermost turn 80 of the coil spring 30, the motor 43 starts to rotate the worm 39 to wind up the coil spring 30. As the coil spring 30 continues to wind up, the outermost turn 80 of the coil spring moves radially inwardly away from the arm 82 of the microswitch 81 causing the microswitch 81 to again open. However, because of the holding circuit 85, the circuit is maintained closed and the motor 43 continues to be energized for a short period of time until a time delay switch 87 in the circuit opens causing the motor 43 to be de-energized. It should be noted that the time delay switch 87 would typically remain closed for approximately a minute or as much time as needed to fully wind up the coil spring 30. The battery 50 is of the rechargeable type inasmuch it is continuously run down during usage of the spring powered device and must be periodically recharged to enable the spring power device to operate.

It should now be clear that whenever the spring power device 10 of the present invention runs down to a certain predetermined point of the energy storage capacity thereof, the high speed motor 43 is caused to be energized by the battery 50 to quickly restore power in the coil spring 30. The point of the running down of the power in the coil spring 30 at which the motor 43 is energized can be adjusted by the circumferential locating of the microswitch 81 on the inner peripheral rim 13 of the main drive gear 12. Thus, in FIG. 4, if the microswitch 81 were to be located at a point on the inner periphery of the rim of the main drive gear 12 spaced clockwise from the location shown, the microswitch 81 would be closed earlier by the outward radial movement of the outermost turn 80 and, therefore, the coil spring 30 would be less run down before it is again rewound. As is evident, by increasing the time of the time delay switch 87 before it opens, the coil spring 30 can be caused to be wound up more tightly each time the motor 43 is energized. It should be especially noted that this restoring of the power of the spring power device 10 can take place even while the main drive gear 12 is being released by pressing on the foot pedal 65 for the purpose of driving the output shaft 48.

It should be especially understood that the electric motor 43 rotates the shaft 19 at high speed so as to quickly wind up the inner end of the coil spring 30. On the other hand the main drive gear 12 is controlled by the braking mechanism 46 so as to be rotated to deliver power to the output shaft through the driven gear 46 at a much slower speed. It should be noted that the main drive gear 12 can be adapted to be controlled by a braking mechanism on the vehicle being propelled rather than the foot operated braking mechanism 46. An advantage of the spring power device 10 is that it provides for at all times applying the power of the electric motor 43 to the load by a yielding connection which permits the driving force built up in the coil spring 30 to be gradually applied to the drive shaft 48.

There may be times where it is desirable to obtain more power from the spring power device 10 than that which may be provided in any particular instance by the energy stored in the coil spring 30. Thus, an auxiliary motor 94 is mounted on the side support 24b with its drive shaft 99 coupled through a magnetic coupler 96 to drive a spur gear 97 whose teeth mesh with the teeth 15 of the main drive gear 12. A separate electric switch 95 is provided to manually selectively connect the battery 50 to the auxiliary motor 94 to drive the same. Note that when the auxiliary motor 94 is not energized, the magnetic coupler 96 on its drive shaft is de-energized enabling the spur gear 97 to rotate freely on the main drive gear 17.

To provide for simply locking the spring power device 10 a solenoid 98 is mounted by screws 101 on the side support 24b, as shown in FIGS. 1 and 5. An index pin 102 is adapted to be actuated by the solenoid 98. Thus, when a switch 100 is closed, which action may be effected by a conventional key, the battery 50 energizes the solenoid 98 and causes the index pin 102 to enter into any one of a number of aligned circumferentially spaced, index openings 103 provided on the side wall 16 of the main drive gear 12.

It should be evident that electric motor 43 is of such a size that although it could not be used to directly drive the load on the output shaft 48 it can, nevertheless, provide for rotating shaft 19 for winding the inner end of the coil spring 30 at a high rate so as to store power therein, which power can then be released for driving the output shaft 48. It is thus evident that by use of the coil spring 30 it is possible to store the power of the motor 43 so that the power supplied to the load by coil spring 30 is greater than that provided by the motor 43. That is to say, when the main drive gear 12 is first released, for example, the power supplied for a short interval by the coil spring 30 may be greater than that provided by the electrical motor 43. However, the average power supplied by the coil spring over a longer period of time would obviously be less than that provided by the electric motor because of energy losses in the transmission.

Figure 8:
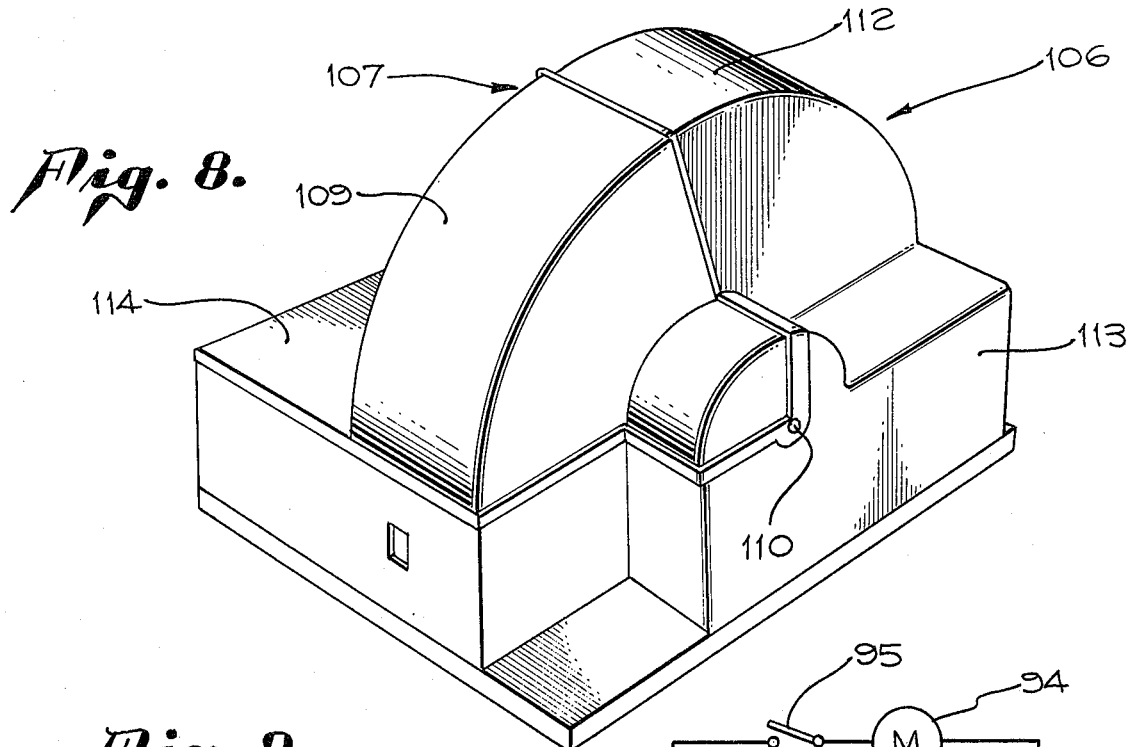
FIG. 8 is a housing for enclosing the spring power device.

A housing 106 for the spring power device 10 is shown in FIG. 8. The housing 106 is made of sheet metal and includes a base 108 and a hood section 107 for enclosing the main drive gear 12. The hood section 107 comprises a movable portion 109 which is pivotally mounted on a pin 110 such that it can be telescopically swung over a fixed portion 112 thereof to gain access to the enclosed main drive gear 12. The housing 106 also includes on one side thereof a compartment 113 for enclosing the main motor 43, the worm 39 and the worm gear 40; and includes on the other side thereof a compartment 114 for enclosing the auxiliary motor 94, the pawl 91 and the ratchet wheel 90.

As shown in FIG. 11, two of the spring power devices of the present invention, herein bearing reference designations 115 and 116, can be used to drive a single output shaft 117. Thus, the spring power device 115 has a main drive gear 118 which is mounted to freely rotate on a shaft 119. The main drive gear 118 engages driven gear 120 to drive the output shaft 117. A coil spring 121 nested within the main drive gear 118 has its inner end anchored to shaft 119 and its outer end anchored to the inner surface of the rim 123 of the main drive gear 118. The spring power device 115 has a separate main motor 124 which is connected through a worm 125 and worm gear 126 to drive the shaft 119. To keep energy stored in coil spring 121, a microswitch 127 attached on the inner surface of rim 123 of main drive gear 118 senses when the coil spring 121 has run down to a predetermined point and operates to connect a battery to energize the main motor 126 to rewind the inner end of the coil spring 121.

The spring power device 116 is identical to device 115 in that it is provided with a main drive gear 130 which engages with the driven gear 131 to drive the output shaft 117. The device 116 is also provided with a main motor 132 connected to rotate shaft 129 to thereby wind up the inner end of its coil spring 133 and, further, is provided with a microswitch 134 on the rim of its main side gear 130. Thus, when microswitch 134 is closed by the unwinding of the coil spring 133 in the manner previously described, a battery is connected in circuit to energize the motor 132 to wind up the inner end of the coil spring 133.

The spring power device 115 and 116 are thus independently operated to provide for storing energy in their respective coil springs 121 and 133. However, the devices 115 and 116 simultaneously operate to supply power for driving the output shaft 117.

It should now be clear that two or more of the spring power devices of the present invention may be adapted to be coupled to drive a common output drive shaft as needed for providing sufficient power for propelling a vehicle. It should be further understood that the control means for controlling the speed of rotation of the main drive gears, such as gear 118, can be either a foot or remote operated braking mechanism on the device, such as the braking mechanism 46 previously described; or, such control means can be in the form of a separate braking mechanism on the vehicle being propelled.

While in order to comply with the statute the invention has been described in language more or less specific as to structural features, it is to be understood that the invention is not limited to the specific features shown but that the means and construction herein disclosed comprise a preferred form of putting the invention into effect, and the invention is therefore claimed in any of its forms or modifications within the legitimate and valid scope of the appended claims.

What is claimed is:

1. A spring power device comprising:
   support means having a shaft rotatably mounted thereon,
   a main drive gear freely journaled on said shaft,
   a multiturn coil spring having its inner end anchored to said shaft and having its outer end anchored to said gear,
   brake means for preventing said main drive gear from rotating until released,
   an electric motor connected to rotate said shaft when energized,
   a battery,
   an electrical circuit including switch means automatically operable to connect said battery to energize said motor to wind up said coil spring whenever it winds down below a predetermined point, said switch means including a microswitch near the outer rim of said main drive gear, said battery being connected to energize said electric motor when the outermost turn of said coil spring moves radially outwardly to contact said microswitch, a holding circuit for keeping said electric motor energized after the outermost turn of said coil spring moves inwardly out of contact with said microswitch, and a time delay switch which opens said electrical circuit after a predetermined period of time to disconnect said battery and thereby terminate the winding of said coil spring by said motor, and
   means for releasing said brake means to enable said main drive gear to be driven by the energy stored in said coil spring.

2. A spring power device comprising:
support means having a shaft rotatably mounted thereon,
a main drive grear freely journaled on said shaft,
a multiturn coil spring having its inner end anchored to said shaft and having its outer end anchored to said gear,
brake means for preventing said main drive gear from rotating until released, said brake means including a pair of brake shoes held against the side surfaces of said main drive gear,
an electric motor connected to rotate said shaft when energized,
a battery,
an electrical circuit including switch means automatically operable to connect said battery to energize said motor to wind up said coil spring whenever it winds down below a predetermined point, and
means for releasing said brake means including control means for separating the brake shoes from the side surfaces of the main drive gear to enable said main drive gear to be driven by the energy stored in said coil spring.

3. A spring power device comprising:
a support means having a shaft rotatably mounted thereon,
a main drive gear freely journaled on said shaft,
a multiturn coil spring having its inner end anchored to said shaft and having its outer end anchored to said gear,
brake means for preventing said main drive gear from rotating until released,
an electric motor connected to rotate said shaft when energized,
a battery,
an electrical circuit including switch means automatically operable to connect said battery to energize said motor to wind up said coil spring whenever it winds down below a predetermined point,
means for releasing said brake means to enable said main drive gear to be driven by the energy stored in said coil spring, and
an auxiliary motor coupled to drive the main drive gear when selectively energized by said battery.

4. A spring power device comprising:
support means having a shaft rotatably mounted thereon,
a main drive gear freely journaled on said shaft,
a multiturn coil spring having its inner end anchored to said shaft and having its outer end anchored to said gear,
brake means for preventing said main drive gear from rotating until released,
an electric motor connected to rotate said shaft when energized,
a battery,
an electrical circuit including switching means automatically operable to connect said battery to energize said motor to wind up said coil spring whenever it winds down below a predetermined point,
means for releasing said brake means to enable said main drive gear to be driven by the energy stored in said coil spring, and
a solenoid having having an index pin, said solenoid mounted adjacent the side wall of the main drive gear, said side wall having index holes circumferentially spaced thereon for receiving said index pin when said solenoid is energized by said battery, whereby said main drive gear is locked against rotation by said coil spring.

5. A power device comprising:
an output shaft,
a battery, and
a plurality of spring motors coupled to simultaneously drive said output shaft,
each said spring motor including:
support means having a winding shaft rotatably mounted thereon,
a main drive gear freely journaled on said winding shaft,
a multiturn coil spring having its inner end anchored to said winding shaft and having its outer end anchored to said gear,
an electric motor connected to rotate said winding shaft when energized, and
an electrical circuit including switch means automatically operable to connect said battery to energize said electric motor to wind up said coil spring whenever it winds down below a predetermined point,
said spring motors being independently operable,
whereby the respective electric motors can be energized by said battery at different times to rotate the respective winding shafts while the output shaft is being driven so that at least one of the coil springs of the plurality of spring motors is sufficiently wound up at all times to provide the power required to drive the output shaft.

* * * * *